Feb. 15, 1955 L. R. HUBER ET AL 2,701,950
COMBUSTION DEVICE AND CHECK VALVE THEREFOR
Filed July 26, 1952 2 Sheets-Sheet 1
Fig.1,
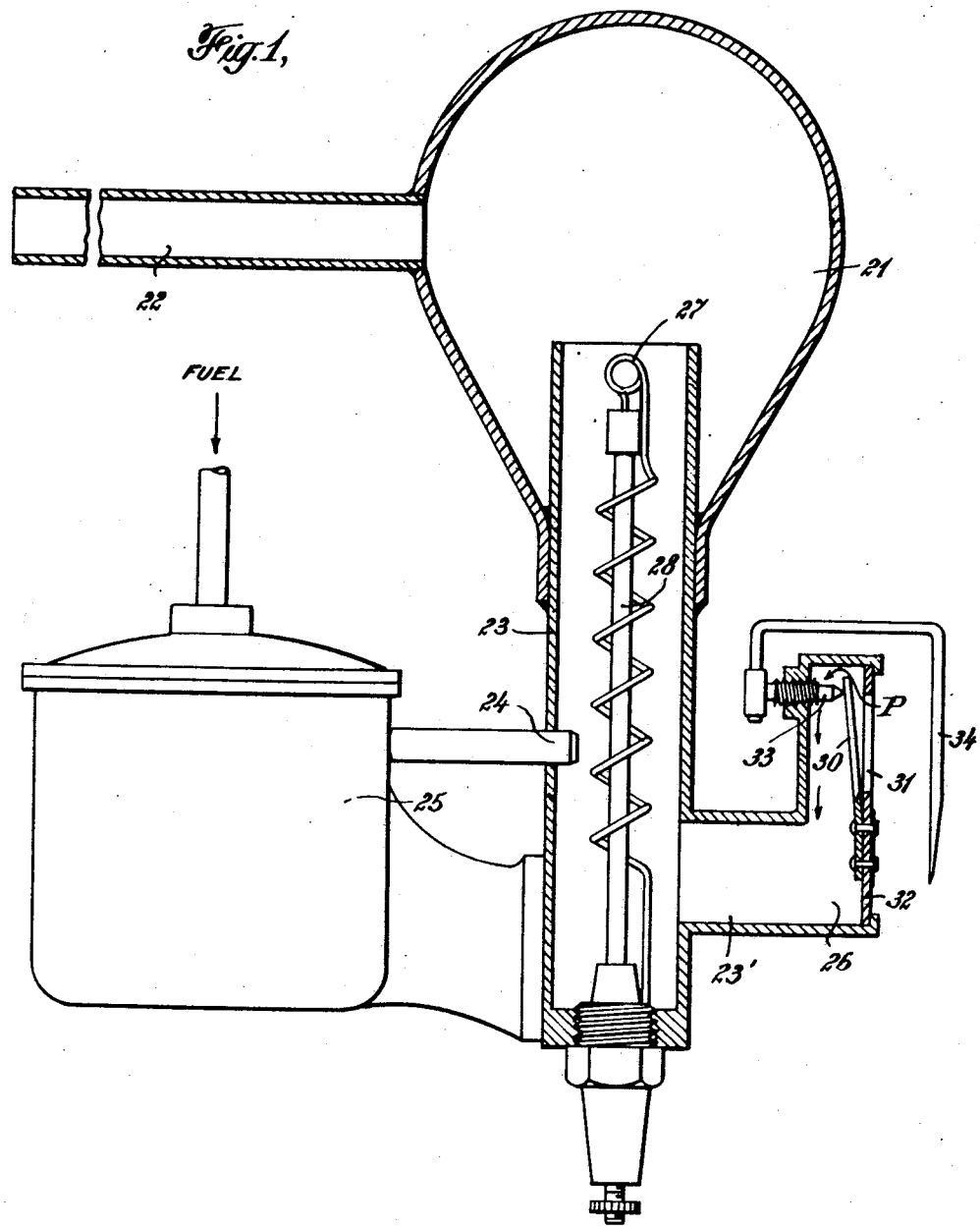
INVENTORS
LUDWIG R. HUBER
FRANZ A. HAAG
BY
Pennie, Edmonds, Morton, Barrows & Taylor
ATTORNEYS Feb. 15, 1955  L. R. HUBER ET AL  2,701,950
COMBUSTION DEVICE AND CHECK VALVE THEREFOR
Filed July 26, 1952   2 Sheets-Sheet 2
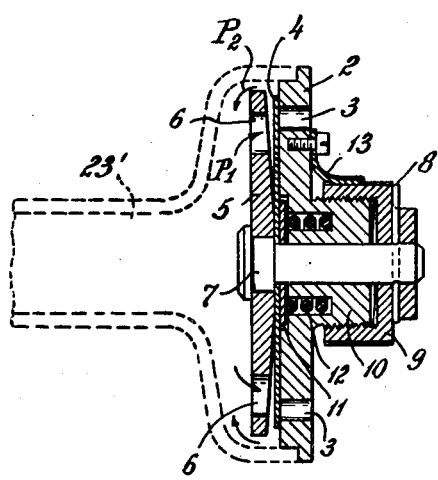
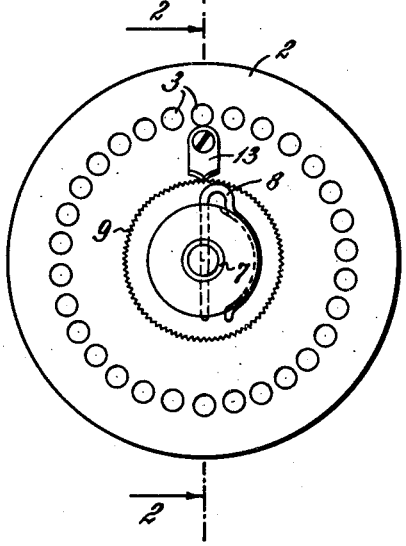
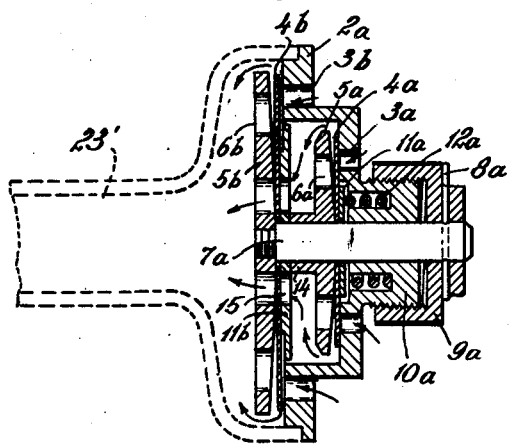
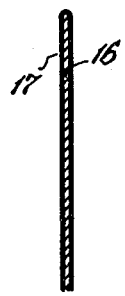
INVENTORS
LUDWIG R. HUBER
FRANZ A. HAAG
BY
ATTORNEYS United States Patent Office 2,701,950
Patented Feb. 15, 1955

2,701,950

COMBUSTION DEVICE AND CHECK VALVE THEREFOR

Ludwig R. Huber and Franz A. Haag, Überlingen am Boden, Germany, assignors, by mesne assignments, to Swingfire (Bahamas) Limited, Nassau, Bahamas, a corporation of Bahamas Application July 26, 1952, Serial No. 301,048

11 Claims. (Cl. 60—39.77)

This invention relates to an improvement in resonant pulse jet combustion devices of the type employing a combustion chamber with a directly connected open exhaust pipe which together form an acoustic resonator. Fuel is periodically detonated in the combustion chamber at the acoustic frequency of the device, and after each detonation, air to support the next detonation is drawn into the combustion chamber through a check valve.

It is an object of the present invention to provide a resonant pulse jet combustion device of the type described having means for variably adjusting the resistance offered by the check valve to the flow of air into the combustion chamber so that optimum resonant combustion can be achieved and maintained by adjustment of the check valve while the device is in operation.

A further object of the invention is the provision of a device of the type described in which the check valve is so located that it remains sufficiently cool during operation of the device so that the check valve may be manually adjusted without burning the hand of the operator.

Another object of the invention is the provision of a check valve adapted for use in a resonant pulse jet combustion device of the type described, the flow resistance of which valve can be readily adjusted in order to provide an air supply best suited to produce stable resonant operation.

A further object of the invention is the provision of a check valve of the type described which can be readily disassembled and cleaned.

Another object of the invention is the provision of a check valve of the type described which is capable of safe and dependable operation at high frequencies for extended periods without danger of fatigue or breakage of its movable diaphragm element or gate.

Another object of the invention is the provision of a check valve of the type described which is so constructed and arranged that its movable element can be readily and inexpensively replaced.

In combustion devices in which detonations recur at acoustic frequencies, it has been proposed to employ check valves provided with valve gates in the form of cup-like elements of sheet steel arranged in rings and which move freely between valve seats and opposed stop plates. It has also been proposed to use triangular valve flaps secured along one side of the triangle. None of these arrangements produces the desired simplicity of control or dependability of operation over long periods at high frequencies.

In accordance with the present invention, there is used as a movable valve closing element or gate, a centrally secured, flexible circular disc or diaphragm which is located between a valve seat forming plate and an adjacent circular stop plate. The stop plate surface that faces the diaphragm is convex and is provided with holes extending therethrough near the periphery thereof. It has been discovered that by using in this combination a valve diaphragm comprising relatively thin membranes of flexible resilient material suitably reinforced and having a very small appropriately adjustable stroke, there is provided an exceptionally quick acting valve that has an exceptional response to small pressure differences and is not subject to fatigue failure. A primary object of the invention is the provision of a simple accurately adjustable check valve incorporating the above-mentioned desirable features.

According to the invention, the movable valve closing element or diaphragm composed of flexible material, such as rubber or the like, is secured to the central supporting bolt of a stop plate, and the distance between the diaphragm and the stop plate on the one hand, and the adjacent valve seat plate on the other, is variably adjustable by a single threaded connection or the like. The stop plate consists of a preferably circular plate having a ring of holes therethrough adjacent its edge. In this arrangement, the common adjustable movement of the flexible diaphragm and the stop plate relative to the valve seat plate may be achieved, for example, by cementing or otherwise securing the central portion of the diaphragm to the central zone of the stop plate. We have found it more expedient, however, to force the central portion of the flexible valve diaphragm against the adjacent central zone of the stop plate by means of a spring which may surround the stop plate supporting bolt and rest on the valve seat plate. Adjustment may then be obtained by means of a nut threadedly connected to the valve seat plate and secured to the stop plate supporting bolt.

The construction generally described above makes it possible to keep the range of movement of the securely supported valve diaphragm within very narrow limits, and to do this without materially reducing the operating forces that act on the diaphragm. The forces acting on the valve diaphragm are actually increased over those so acting in previously known constructions, because the holes through the stop plate conduct operating fluid pressures to the entire surface of the movable part of the diaphragm. As a result, the valve diaphragm operates reliably even at very high frequencies and also resists the stresses of prolonged operation without appreciable fatigue impairment or failures. We have found that the useful life of the valve diaphragm can be further increased if the adjacent surfaces of the stop plate and the valve seat plate which are engaged by the diaphragm at the ends of its stroke are so formed as to correspond to and fit the entire adjacent surfaces of the valve diaphragm when in its extreme positions. With this arrangement, the impact of the diaphragm on the plates at the end of each stroke is effectively damped by an air cushion formed between the diaphragm and the adjacent stop or valve seat plate.

In describing the invention in detail, reference will be made to the accompanying drawing, in which certain embodiments thereof are illustrated.

In the drawing:

Fig. 1 is an elevation, partly in section, illustrating a pulse jet combustion device embodying an adjustable air inlet check valve according to the invention;

Fig. 2 is a cross-sectional elevation of a single diaphragm valve embodying the invention, the section being taken on the line 2—2 of Fig. 3;

Fig. 3 is an outside end elevation of the valve of Fig. 2;

Fig. 4 is a cross-sectional elevation of a valve embodying the invention and having two diaphragms; and Fig. 5 is an enlarged sectional view of a rubber coated metal diaphragm suitable for use in the improved valve.

The resonant pulse jet combustion device shown in Fig. 1 includes a combustion chamber 21, to which is connected an exhaust pipe 22, the length of which preferably approximates one-fourth of the wave length of the natural frequency of the acoustical resonator formed by the combustion chamber and the exhaust pipe. An inlet mixing tube 23 projects into the combustion chamber 21, and a fuel jet 24 of a carburetor 25 opens into the tube 23. The check valve 26 is attached to the tube 23 near its outer end by a lateral duct 23'. During the vacuum phase of operation of the device, fresh air from the atmosphere is drawn into the combustion chamber 21 through the check valve 26 in the direction of the arrow P, and this air then mixes in the tube 23 with the fuel supplied by the jet 24. Upon entering the combustion chamber 21, the fuel mixture thus formed is ignited by the hot wire 27 which is supported by a rod 28 and may be heated electrically to start the device.

The check valve 26 may, for example, comprise a thin tongue or strip 30 of flexible resilient material, such as sheet steel, and it is secured to the plate 32 in a position to alternately close the air inlet port 31 in the plate 32, and lift from this plate to open the port, the action being similar to that of the clarinet reed. Opening of the port 31 by the strip 30 occurs as soon as a vacuum in the combustion chamber 21 draws in air in the direction of the arrow P. In accordance with the invention, there is provided a stop screw 33 for the tongue 30 which is adjustable by the handle 34 and which limits the distance which the tongue 30 may move away from the plate 32. By adjusting the screw 33 by means of the handle 34, it is possible to control the width of the opening through which air enters in the direction of the arrow P. The resistance to flow imposed by the check valve 26 depends upon this width of opening.

We have discovered that the correct selection of the resistance to flow imposed by the check valve is of decisive importance to the stable resonant pulsating operation of the combustion device. If this flow resistance is too low, the incoming fresh air destroys the vacuum in the combustion chamber so rapidly as to prevent the requisite return surge of gas from the exhaust tube which is essential to compress the combustion mixture and so produce detonation. If the resistance to air flow through the check valve is too high, insufficient air is drawn into the combustion chamber to maintain combustion. The requirements of different individual combustion devices as to the appropriate resistance to flow in the check valve varies, and the requirements of each individual combustion device may change after prolonged operation. We have discovered that by adjusting the check valve gap by means of the screw 33, it is possible in any given device to select a gap that produces the optimum state of stable resonant pulsation, as well as to compensate for changes in the natural frequency of the resonator 21, 22 which results from the gradual roughening or fouling of the inner surfaces of the combustion chamber 21 and exhaust tube 22 after prolonged use. The handle 34 of the screw 33 remains cool and may, therefore, be adjusted by hand during operation of the device.

Check valves employing as their valve closing elements tongues or strips of steel have a limited life, because the steel strip usually breaks at the point where it is bent after a few hundred thousand oscillations. It is therefore more appropriate to use as the valve closing element or gate a diaphragm of a soft material such as rubber or the like. In this case, a supporting or stop plate is provided behind the diaphragm, and the adjustment of the valve gap is carried out by adjusting the position of this stop plate. Embodiments of check valves of this type are illustrated in Figs. 2 to 5.

The valve seat plate 2 of the check valve illustrated in Figs. 2 and 3 is suitably connected to the inlet mixing duct of a resonant pulse jet combustion device by means of a duct which may comprise the lateral duct 23' shown in Fig. 1. The valve seat plate 2 is preferably circular and is provided with a ring of holes 3 extending therethrough adjacent the periphery thereof and which act as the air inlet ports of the valve. The movable valve closing element or gate comprises a flexible resilient circular diaphragm 4, the outer portion of which moves alternately against the valve seat plate 2 and the adjacent stop plate 5 and alternately covers the valve seat plate holes 3 and a corresponding ring of holes 6 through the stop plate adjacent its periphery. Excess pressure within the duct 23' acts in the direction of the arrows P₁ through the stop plate holes 6 on the entire inner surface of the diaphragm 4, forcing the diaphragm against the valve seat plate 2 and so closing the holes 3 in that plate. If there is a vacuum within the duct 23', air from the atmosphere outside the valve enters through the valve seat plate holes 3 and presses upon the entire outer surface of the diaphragm 4, forcing the diaphragm inward against the stop plate 5. In this inner position of the diaphragm, air enters the duct 23' from the outer atmosphere in the direction of the arrows P₂ through the holes 3 and around the outer edges of the diaphragm 4 and the stop plate 5. Since this entering air, as it leaves the valve seat plate holes 3, is deflected radially outward along the diaphragm 4, the cross-section of the channel through which it flows toward the diaphragm edge expands as in a venturi passage, and for this reason the flow resistance of the valve in the air passing direction is relatively low despite a very small movement of the edge of the diaphragm 4 in moving from the valve closing to the valve opening position. For this reason, the force required for reliable and positive operation of the valve is very small, and the elastic stress to which the diaphragm 4 is subjected is so low that there is no discernible fatigue deterioration of the material forming the diaphragm even after the valve has been opened and closed many millions of times.

The check valve will remain wholly open during the phase of operation in which it passes air only if, during such phase, a predetermined minimum pressure difference is maintained across the check valve. To maintain such pressure difference, and to maintain continuous operation of the combustion device, as has been explained, the resistance to flow of air around the edge of the diaphragm of the valve must not be too low or too high. In order to obtain optimum operating conditions, this pressure drop across the valve must be suited to the particular conditions of the pressure pulsations to which the valve is subjected. To permit adjustment of the pressure drop across my improved check valve to such optimum operating conditions, the stop plate 5 is suitably secured to and carried by a bolt 7 extending through the central hole in the diaphragm 4 and valve seat plate 2 and connected by a removable cotter pin 8 to a knurled nut 9 which threadedly engages a bushing 10 that extends from the outer surface of the valve seat plate 2. The diaphragm 4 is forced against the stop plate 5 by a compressed spring 12 acting through a ring 11. With this arrangement, it is possible to effect a fine adjustment of the distance between the diaphragm 4 which moves with the stop plate 5 and the valve seat plate 2, and thereby to exactly control the gap of and the resistance to flow through the valve in the direction of the arrows P₂.

In order to hold the nut 9 in its adjusted position, there may be suitably secured to the outer face of the valve seat plate 2 a spring finger 13 which engages the grooves of the knurled nut 9. With this arrangement, the valve adjustment may be maintained even though the valve is dismantled for cleaning or inspection. Such dismantling is accomplished by removing the valve seat plate 2 from the casing and pulling the cotter pin 8 out of the nut 9 so that the bolt 7 may be removed from the nut 9 without changing the adjusted position of the nut. The removal of the bolt 7 and stop plate 5 gives access to the diaphragm and to the holes 3 and 6 for cleaning and other service.

The material employed to form the valve diaphragm 4 is of some importance in determining the manner in which the valve operates. In accordance with the invention, the diaphragm should be thin and light in weight so as to be readily movable by a light force. It should, however, have sufficient rigidity so that its entire surface takes up the fluid pressure forces and transmits them to the relatively small area of the diaphragm that is secured to the stop plate. In order to obtain a good seal, the diaphragm desirably has a soft, rubber-like surface. The material of the diaphragm should preferably be free from fatigue phenomena and should not have any tendency to failure under repeated stress. These and other desirable properties may be obtained, as illustrated in Fig. 5, by forming the diaphragm 4 from a thin sheet of beryllium bronze alloy 16 with a coating of high chlorinated rubber 17 thereon. The diaphragm may alternatively be made of plastic films reinforced with fabric. Also, there may be used diaphragms formed of artificial rubber built up of several layers of different hardness that are rolled or pressed together. It has been found important to the life of the diaphragm that the stop plate 5 be formed with a cross-section such that its contour facing the diaphragm corresponds to the surface position assumed by the diaphragm when moved to the open or stop position. Such an arrangement provides a soft, full-surface stop action for the diaphragm, the arresting of movement thereof being cushioned by air between the parts. The same relation of plate surface contour to diaphragm surface position may to advantage be employed in connection with the valve seat plate 2.

Since the improved valve of the invention is symmetrical about its central axis, it is possible, in accordance with the invention, to incorporate two or more valve mechanisms in parallel in a single axially symmetrical structure. Such an embodiment of the invention employing two diaphragms and having a correspondingly higher throughput capacity is illustrated in Fig. 4.

The embodiment of Fig. 4 employs a valve seat plate 2a disposed in two different parallel planes, as shown, and having two concentric circular rings of port forming holes 3a and 3b formed therein. The respective diaphragms 4a and 4b are respectively disposed behind the two rings of valve seat plate holes 3a and 3b. A stop plate 5a is located behind the diaphragm 4a and a stop plate 5b is located behind the diaphragm 4b. Rings of holes 6a and 6b are respectively provided in the stop plates 5a and 5b adjacent their edges. A ring 11a forces the central part of the diaphragm 4a against the stop plate 5a and a ring 11b forces the central part of the diaphragm 4b against the stop plate 5b. A compressed coil spring 12a bears on the ring 11a and the spring pressure is transmitted to the ring 11b by a shoulder 14 on the stop plate 5a. The stop plate 5a is slidably mounted on the central bolt 7a, which is rigidly secured to the stop plate 5b. With this arrangement, it is possible to simultaneously adjust the positions of the diaphragms 4a and 4b and their supporting plates 5a and 5b relative to the valve seat plate 2a by means of the knurled nut 9a which is fixed to the bolt 7a by a cotter pin 8a and which threadedly engages a bushing 10a extending from the outside of the valve seat plate 2a. The diaphragm 4b and its stop plate 5b are provided with a ring of holes 15 near the bolt 7a so that air passing through the holes 3a and around the edge of the diaphragm 4a may enter the duct 23′ leading to the inlet chamber of the combustion device. At the same time air enters the duct 23′ through the holes 3b around the edge of the diaphragm 4b.

Dismantling and cleaning of the valve of Fig. 4 are practically as simple as in the case of the valve shown in Figs. 2 and 3. The cotter pin 8a is removed and the bolt 7a is pulled out toward tht left, as shown in Fig. 4, whereupon the holes 3a and 3b are exposed and the other valve parts may be pulled off the bolt for cleaning, inspection or replacement.

We claim:

1. A resonant pulse jet combustion device comprising a combustion chamber, an open exhaust pipe connected to the combustion chamber and forming therewith an acoustic resonator, an air inlet check valve, an inlet tube connecting said check valve to said combustion chamber, a fuel supply nozzle opening into said inlet tube and ignition means in said combustion chamber, said check valve having an inlet port, a flexible valve element alternately movable through a predetermined stroke toward and away from said port to close and open the same, and means operable from the outside of said check valve for variably adjusting the extent of movement of said valve element away from said port to limit said extent of movement of said predetermined stroke and consequently the resistance to the flow of air into said port while the combustion device is in operation without materially altering the resistance to movement of the valve element through its stroke.

2. A resonant pulse jet combustion device as defined in claim 1 in which a stop member adjacent but spaced from the inlet port is provided for terminating movement of the valve element in a direction away from the inlet port and in which the adjusting means acts to alter the distance between the inlet port and the stop member.

3. A resonant pulse jet combustion device as defined in claim 1 in which the check valve comprises a substantially circular valve seat plate having ports therein adjacent its edge, a substantially circular stop plate adjacent said valve seat and having a surface facing said valve seat plate which is convexly arched toward said valve seat plate, said stop plate having holes therethrough adjacent its edge, a substantially circular flexible resilient diaphragm held against said stop plate adjacent its central portion and disposed between said stop plate and said valve seat plate and extending in overlapping relation to said ports in said valve seat plate and said holes in said stop plate, and in which the variably adjustable means comprises screw threaded means for variably adjusting the distance between the connected diaphragm and stop plate and the valve seat plate.

4. A resonant pulse jet combustion device as defined in claim 1 in which the check valve comprises a substantially circular valve seat plate having ports therein adjacent its edge, a substantially circular stop plate adjacent said valve seat plate and having a surface facing said valve seat plate which is convexly arched toward said valve seat plate, said stop plate having holes therethrough adjacent its edge, a substantially circular flexible resilient diaphragm disposed between said stop plate and said valve seat plate and extending in overlapping relation to the ports and holes in said plates and in which the variably adjustable means comprises a bolt centrally fixed to said stop plate and extending through central openings in said diaphragm and said valve seat plate, a spring surrounding said bolt and compressed between said valve seat plate and said diaphragm for resiliently holding said diaphragm against said stop plate, and a nut removably secured to said bolt beyond said valve seat plate and threadedly connected to said valve seat plate for adjustably moving both said diaphragm and said stop plate relative to said valve seat plate.

5. A resonant pulse jet combustion device as defined in claim 1 in which the check valve comprises a substantially circular valve seat plate having two concentric rings of ports therethrough, two substantially circular stop plates each disposed adjacent one of the rings of ports in said valve seat plate, each of said stop plates having holes therethrough and having surfaces facing said valve seat plate which are convexly arched toward said valve seat plate, two substantially circular flexible resilient diaphragms each held against one of said stop plates and disposed between said valve seat plate and one of said stop plates in overlapping relation to one of said rings of ports in said valve seat plate, and in which the variably adjustable means comprises means for simultaneously variably adjusting the distance between said stop plates and diaphragms on the one hand and said valve seat plate on the other.

6. A check valve comprising a substantially circular valve seat plate having ports therein adjacent its edge, a substantially circular stop plate adjacent said valve seat and having a surface facing said valve seat plate which is convexly arched toward said valve seat plate, said stop plate having holes therethrough adjacent its edge, a substantially circular flexible resilient diaphragm, means for holding said diaphragm against said stop plate adjacent its central portion, said diaphragm being disposed between said stop plate and said valve seat plate and extending in overlapping relation to said ports in said valve seat plate and said holes in said stop plate, and screw threaded means for variably adjusting the distance between the connected diaphragm and stop plate on the one hand and the valve seat plate.

7. A check valve according to claim 6 in which the diaphragm is formed of metal coated with rubber.

8. A check valve according to claim 6, further characterized in that the means for holding the diaphragm against the stop plate comprises a spring compressed between the valve seat plate and the central portion of the diaphragm.

9. A check valve comprising a substantially circular valve seat plate having ports therein adjacent its edge, a substantially circular stop plate adjcent said valve seat plate and having a surface facing said valve seat plate which is convexly arched toward said valve seat plate, said stop plate having holes therethrough adjacent its edge, a substantially circular flexible resilient diaphragm disposed between said stop plate and said valve seat plate and extending in overlapping relation to the ports and holes in said plates, a bolt centrally fixed to said stop plate and extending through central openings in said diaphragm and said valve seat plate, a spring surrounding said bolt and compressed between said valve seat plate and said diaphragm for resiliently holding said diaphragm against said stop plate, and a nut removably secured to said bolt beyond said valve seat plate and threadedly connected to said valve seat plate for adjustably moving both said diaphragm and said stop plate relative to said valve seat plate.

10. A check valve comprising a substantially circular valve seat plate having two concentric rings of ports therethrough, two substantially circular stop plates each disposed adjacent one of the rings of ports in said valve seat plate, each of said stop plates having holes therethrough and having surfaces facing said valve seat plate which are convexly arched toward said valve seat plate and two substantially circular flexible resilient diaphragms, means for holding each of said diaphragms against one of said stop plates, said diaphragms being disposed between said valve seat plate and one of said stop plates in overlapping relation to one of said rings of ports in said valve seat plate.

11. A check valve comprising a substantially circular valve seat plate having two concentric rings of ports therethrough, two substantially circular stop plates each disposed adjacent one of the rings of ports in said valve seat plate, each of said stop plates having holes therethrough and having surfaces facing said valve seat plate which are convexly arched toward said valve seat plate, two substantially circular flexible resilient diaphragms, means for holding each of said diaphragms against one of said stop plates, each of said diaphragms being disposed between said valve seat plate and one of said stop plates in overlapping relation to one of said rings of ports in said valve seat plate, and means for simultaneously variably adjusting the distance between said stop plates and diaphragms on the one hand and said valve seat plate on the other.

References Cited in the file of this patent

UNITED STATES PATENTS

| | | |
|---|---|---|
| 618,904 | Prince | Feb. 7, 1899 |
| 771,327 | Schmidt | Oct. 4, 1904 |
| 948,132 | Clark | Feb. 1, 1910 |
| 1,021,521 | Héroult | Mar. 26, 1912 |
| 1,956,691 | McCune | May 1, 1934 |
| 2,068,248 | Schroeder | Jan. 19, 1937 |
| 2,193,243 | Teeter | Mar. 12, 1940 |
| 2,576,637 | Patriquin | Nov. 27, 1951 |
| 2,609,660 | Tenney | Sept. 9, 1952 |

FOREIGN PATENTS

| | | |
|---|---|---|
| 541,372 | France | May 2, 1922 |
| 485,466 | Germany | Nov. 11, 1929 |
| 10,227 | Great Britain | May 28, 1894 |
| 594,098 | Great Britain | Nov. 3, 1947 |